United States Patent
Rosasco (10) Patent No.: US 9,495,767 B2
(45) Date of Patent: *Nov. 15, 2016

(54) INDEXED UNIFORM STYLES FOR STROKE RENDERING

(71) Applicant: GOOGLE INC., Mountain View, CA (US)

(72) Inventor: John Rosasco, Santa Cruz, CA (US)

(73) Assignee: GOOGLE INC., Mountain View, CA (US)

(*) Notice: Subject to any disclaimer, the term of this patent is extended or adjusted under 35 U.S.C. 154(b) by 99 days.

This patent is subject to a terminal disclaimer.

(21) Appl. No.: 14/277,838

(22) Filed: May 15, 2014

(65) Prior Publication Data

US 2015/0332481 A1    Nov. 19, 2015

(51) Int. Cl.
| | |
|---|---|
| *G06T 11/00* | (2006.01) |
| *G06T 15/00* | (2011.01) |
| *G06T 11/60* | (2006.01) |
| *G06T 3/40* | (2006.01) |

(52) U.S. Cl.
CPC ........... *G06T 11/001* (2013.01); *G06T 3/40* (2013.01); *G06T 11/60* (2013.01); *G06T 15/005* (2013.01)

(58) Field of Classification Search
None
See application file for complete search history.

(56) References Cited

U.S. PATENT DOCUMENTS

| 6,766,248 | B2 * | 7/2004 | Miyahara | G01C 21/32 340/990 |
|---|---|---|---|---|
| 7,928,990 | B2 | 4/2011 | Jiao et al. | |
| 8,274,524 | B1 | 9/2012 | Cornell et al. | |
| 8,441,497 | B1 | 5/2013 | Hutchins et al. | |
| 8,537,169 | B1 | 9/2013 | Bolz et al. | |
| 8,803,901 | B1 | 8/2014 | Cornell et al. | |
| 8,937,627 | B1 | 1/2015 | Otero et al. | |
| 2005/0206657 | A1 | 9/2005 | Arcas | |
| 2005/0219268 | A1 | 10/2005 | Kyle | |
| 2006/0161572 | A1 | 7/2006 | Vogt et al. | |
| 2006/0267982 | A1 | 11/2006 | Aguera y Arcas | |

(Continued)

OTHER PUBLICATIONS

International Search Report and Written Opinion for Application No. PCT/US2015/030816, dated Jul. 29, 2015.

(Continued)

*Primary Examiner* — Michael J Cobb
(74) *Attorney, Agent, or Firm* — Marshall, Gerstein & Borun LLP (57) ABSTRACT

Style parameters, which specify respective visual parameters for rendering a map feature at multiple zoom levels, are stored as an indexed data structure in one or more uniform variables that are (i) accessible in multiple stages of a rendering pipeline, (ii) unchanged during execution of the multiple stages of the rendering pipeline. A selection of a zoom level at which the map feature is to be displayed is received via a user interface. One or more indices (exactly one in a typical case) are paired with every stylized vertex drawn. The vertex shader is configured to retrieve corresponding style parameters from the indexed data structure using the one or more indices and render the map feature at the selected zoom level using the retrieved style parameters.

18 Claims, 4 Drawing Sheets

(56) References Cited

U.S. PATENT DOCUMENTS

| | | | |
|---|---|---|---|
| 2007/0171234 A1* | 7/2007 | Crawfis | G06T 17/05 345/587 |
| 2008/0291201 A1 | 11/2008 | Lafon | |
| 2008/0303841 A1 | 12/2008 | Newhall, Jr. | |
| 2010/0141659 A1* | 6/2010 | Bourd | G06T 11/203 345/442 |
| 2010/0321399 A1 | 12/2010 | Ellren et al. | |
| 2011/0242119 A1* | 10/2011 | Bolz | G06T 15/005 345/522 |
| 2013/0018571 A1 | 1/2013 | Miwa | |
| 2013/0080504 A1* | 3/2013 | Maurer | G06F 17/30241 709/203 |
| 2013/0093757 A1* | 4/2013 | Cornell | G06T 17/05 345/419 |
| 2013/0147846 A1* | 6/2013 | Kalai | G01C 21/32 345/660 |
| 2014/0043342 A1 | 2/2014 | Goel et al. | |
| 2014/0047381 A1 | 2/2014 | Fan et al. | |
| 2014/0347383 A1 | 11/2014 | Cornell et al. | |

OTHER PUBLICATIONS

"Graphics.Rendering.OpenGL.GL.VertexSpec," HOpenGL Libraries. Retrieved from the Internet on Mar. 6, 2014: URL:http://cvs.haskell.org/Hugs/pages/libraries/OpenGL/Graphics-Rendering-OpenGL-GL-VertexSpec.html#2.

U.S. Appl. No. 14/153,951, filed Jan. 13, 2014.

\* cited by examiner

INDEXED UNIFORM STYLES FOR STROKE RENDERING

FIELD OF TECHNOLOGY

The present disclosure relates to interactive digital maps and, more particularly, to rendering representations of paths on digital maps at varying camera distances or zoom levels.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

For information clarity, roads, bicycle paths, transit lines, and similar features are represented on digital maps in a stylized, rather than a realistic, form. For example, the style in which a road segment is represented on a digital map can include a set of visual parameters such as the number of strokes (e.g., one for the outline and one for the fill color), per-stroke attributes such as stroke width, stroke color, etc. Thus, drawings stylized paths in near real time (e.g., using Graphics Processing Unit, or GPU, hardware) is essential for providing quality mapping applications. Without a high-performance solution to drawings stokes, a mapping application loses fluidity, and without appropriately stylized stokes, a mapping application loses aesthetics and/or clarity.

Some mapping applications are implemented in a client-server architecture where a computer or mobile device, such as a smartphone, runs a local client that is served map data from a centralized server. A map of the earth with sufficient detail for navigation requires a huge amount of data. To make this data manageable by client devices with limited resources (memory, disk space, CPU processing cycles), data is often buffered by the server and parceled out to the client as needed.

Client devices typically render scenes from a top-down vantage point or at some angle from this vantage point up to ninety degrees. As the altitude of this vantage point changes, the level of detail of the map view must change accordingly. For example, the user may wish to view continents or city blocks. To manage this wide gamut of levels of detail, servers often serve map data at discrete levels (zoom levels) corresponding to altitudes of views above the map.

As one example, a server can provide definitions of styles for rendering roads and other map features at several discrete zoom levels. In some cases, the server does not provide style definitions for every discrete zoom level in the valid range. Thus, the server may provide style definitions for roads only at discrete zoom levels N and N+2, even if a client device at some point may display a digital map at zoom level N+1. Moreover, on some devices, such as smartphones and tablet computers capable of receiving gesture input, the positioning of a virtual camera in a digital mapping application may be updated in a continuous manner or at least in a manner with much finer granularity than the discrete zoom levels at which data is served. It is therefore possible for a client device to display a digital map at zoom level 7.5 or 8.45, for example. However, it is impractical for the server to attempt to provide style data to client devices for hundreds or thousands of fractional zoom levels.

SUMMARY

To enable a rendering pipeline to efficiently interpolate style information defined for map features at several zoom levels, a computing device encodes interpolatable visual parameters for various styles as an indexed data structure in uniform parameters, which are accessible in multiple stages of a rendering pipeline and remain unchanged during execution of the various stages of the rendering pipeline. In this manner, a mapping application can encode a single index into the indexed data structure representing the style information that can be decoded during vertex shading. Moreover, to fluidly and continuously transition between zoom levels, the vertex shader can interpolate style parameters to render map features at intermediate zoom levels for which style information is not available. As one example, a certain stroke may have a style change across successive zoom levels. More specifically, a road that may not be visible at five thousand meters above the ground but be visible a one thousand meters from the ground. When a client device receives only discrete zoom-level data from a map data server, the client device makes the transition appear natural and smooth by increasing the transparency of the road as the altitude increases until the road disappears.

According to one implementation of these techniques, a method for providing map features on interactive digital maps includes storing style parameters, which specify respective visual parameters for rendering a map feature at a plurality of zoom levels, as an indexed data structure in one or more uniform variables that are (i) accessible in multiple stages of a rendering pipeline, (ii) unchanged during execution of the multiple stages of the rendering pipeline. The method also includes receiving, via a user interface, a selection of a zoom level at which the map feature is to be displayed. Further, the method includes providing one or more indices into the indexed data structure to a vertex shader based on the selected zoom level and causing the vertex shader to retrieve corresponding style parameters from the indexed data structure using the one or more indices and render the map feature at the selected zoom level using the retrieved style parameters.

According to another implementation, a memory module (e.g., a hard disk, a flash drive, or random access memory (RAM)) stores instructions, where the instructions are executable on one or more general-purpose processors of a computing device, such as a central processing unit (CPU). The instructions cause the computing device to store style parameters, which specify respective visual parameters for rendering a map feature at a plurality of zoom levels, as an array of uniform variables that are (i) accessible in multiple stages of a rendering pipeline implemented in one or more graphics processors, (ii) unchanged during execution of the multiple stages of the rendering pipeline, wherein the array is indexed by style identifiers. The instructions further cause the computing device to receive, via a user interface of the computing device, a selection of a zoom level at which the map feature is to be displayed, determine a style identifier that identifies a style using which the map feature is rendered at the selected zoom level, provide the style identifier to a vertex shader executable on the one or more graphics processors; and cause the vertex shader to retrieve corresponding style parameters from the array of uniform variables using the style identifier and render the map feature at the selected zoom level using the retrieved style parameters.

According to yet another implementation, a computing device includes one or more general-purpose processors, a graphics pipeline implemented in one or more graphics processors, a uniform buffer to store uniform parameters accessible in multiple stages of a rendering pipeline, where the uniform parameters are unchanged during execution of the multiple stages of the rendering pipeline, a user interface, and a non-transitory computer-readable memory storing instructions. When executed by the one or more general-purpose processors, the instructions cause the computing device to store, as an indexed data structure in the uniform buffer, style parameters specifying respective visual parameters for rendering a map feature at a plurality of zoom levels. The instructions further cause the computing device to receive, via a user interface, a selection of a zoom level at which the map feature is to be displayed, provide one or more indices into the indexed data structure to a vertex shader executable as part of the graphics pipeline, in accordance with the selected zoom level, and cause the vertex shader to retrieve corresponding style parameters from the indexed data structure using the one or more indices and render the map feature at the selected zoom level using the retrieved style parameters.

DETAILED DESCRIPTION

A mapping application operating in a computing device implements a graphics pipeline that includes vertex shaders and fragment shaders. The mapping application receives style parameters, such as widths and colors of strokes and the number of strokes, for rendering roads and/or similar map features at certain zoom levels. To render these map features, the mapping application augments a set of conventional vertex attributes (which contain at least spatial information and, in some cases, other vertex attributes such as texture coordinates) with indices into an indexed set of uniforms storing the style parameters. The uniforms are commonly accessible by all vertex shaders and fragment shaders and persistently store the style parameters through multiple executions of shaders. The mapping application provides the vertex attributes (augmented with the indices) to a vertex shader, which retrieves, via the indices, and, in some cases, interpolates style parameters to generate interpolated style parameters for an intermediate zoom levels.

For clarity, a brief overview of a typical graphics pipeline is provided below, and an example computing system in which some or all of the techniques outlined above can be implemented is then discussed with reference to FIG. 1.

Modern Hardware Graphics Renderers

To render stylized roads and other features as discussed above, a client device can utilize a hardware graphics renderer in a GPU, that implements two pipeline shading stages. The first stage corresponds to vertex shaders that operate on vertices, which describe polygons drawn in a "framebuffer" (see below). The second stage corresponds to fragment shaders that operate on "fragments" visible in a frame, or sets of pixels that make up a frame. For example, the client device can create a collection of triangles (made up of points defined in two or three dimensions) and pass the collection of triangles to the GPU. For each triangle T in the collection, the GPU then can run a vertex shader on each vertex of triangle T, and a fragment shader on each pixel enclosed by triangle T.

Modern hardware 3D graphics renderers, such as an OpenGL® ES renderer, perform optimally when rendering state changes are minimal with respect to the amount of data being drawn. The basic I/O model of these hardware renderers can be described as follows: the renderers receive vertices and texture (pixel) data and produce fragments. Generally speaking, to render a frame of information on a hardware graphics renderer, the following steps are taken: (1) the region in memory for storing bitmaps, known as a framebuffer, is cleared and (2) for each logical object in the rendered frame: (2a) vertex and texture data are prepared for rendering, (2b) the state of the graphics pipeline is set, and (2c) a draw function to draw the data is executed.

Step (2c) above describes a common programming loop. Accordingly, the fewer iterations there are of step (2c), the better the software application will perform. This principle of maximizing rendering performance can be referred to as "batching." To comply with the principle, software applications must batch together as many like elements of graphics state and draw these like elements atomically.

Another important principle for maximizing performance is to minimize shading logic. Vertex shaders are executed once per vertex for objects visible in a frame being rendered, whereas fragment shaders are executed at least once per output pixel (fragment) of the frame. In some cases, fragment shading may occur many times for a single output fragment, such as in multi-pass or blended rasterization. A typical modern display may contain millions of pixels in an output frame and tens of thousands of vertices. To perform better, software applications must reduce the complexity of these shaders that must be run so frequently.

System Overview

Figure 1:
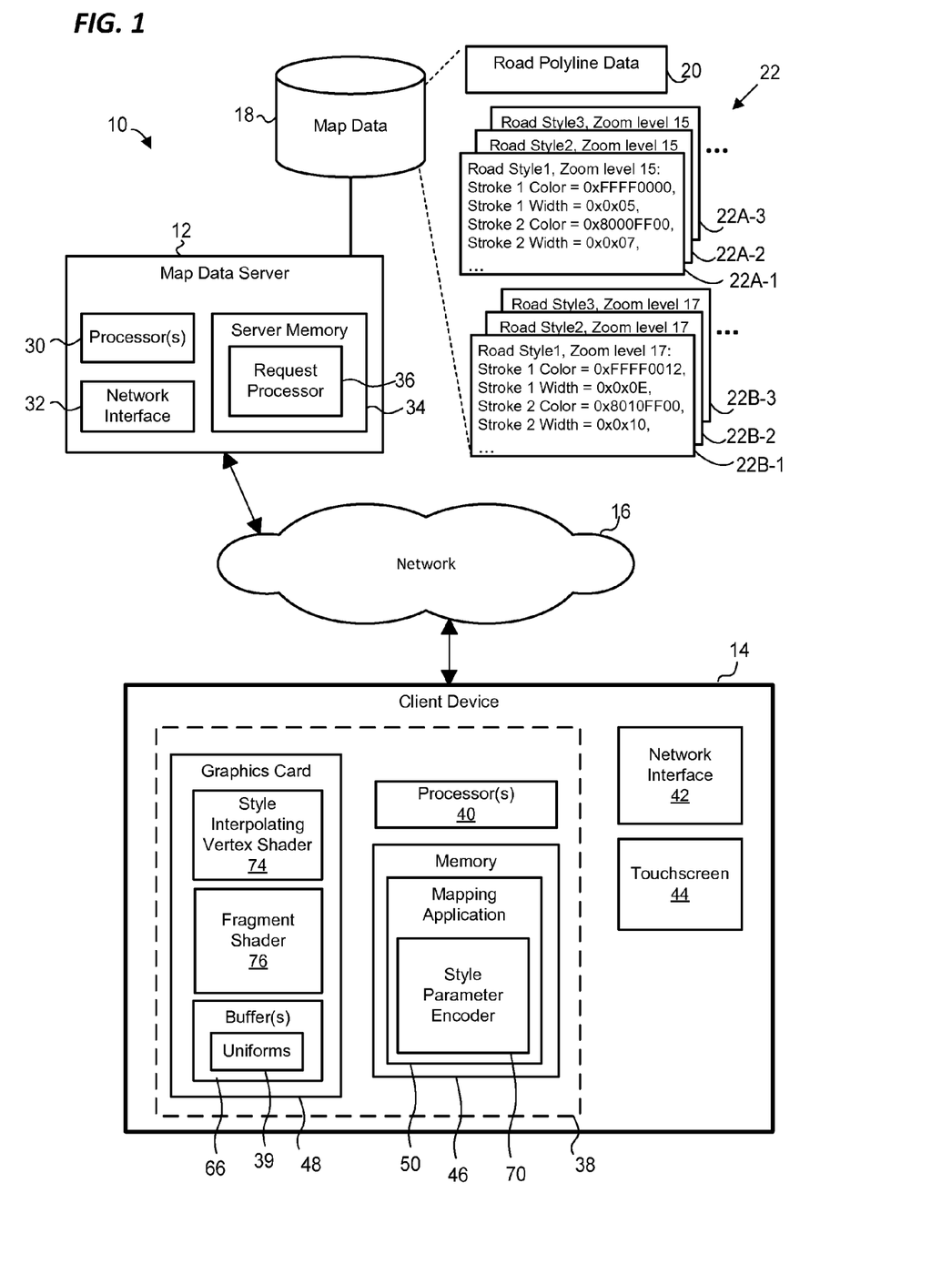
FIG. 1 is a block diagram of an example computing system in which indexed sets of uniforms corresponding to style parameters can be implemented.

FIG. 1 is a block diagram of an example computing system 10 in which a map data server 12 provides map data to a client device 14 via a communication network 16 for rendering an interactive digital map. Map data, which can be stored in a map database 18, can include road polyline data 20. Besides roads designed for vehicles, the road polyline data 20 can describe bicycle paths, pedestrian paths, railway paths, shipping routes, airlines routes, etc. For convenience, all types of paths may be referred to in this application as "roads" or "paths." Further, it is noted that the techniques of this disclosure also can apply to virtual boundaries of countries, cities, etc., when these boundaries are illustrated on a digital map using stroke-based rendering.

Map data stored in the map database 18 also can include descriptions of geometry for various other map features such as buildings, parks, and bodies of water, text labels, textures, various forms of metadata, etc. Some of these map features can be defined in a vector graphics format or another suitable scaleable format. In some cases, map data also can include raster images in a bitmap format, for example.

The map data server 12 may organize and serve map data to client devices using any suitable scheme, such as map tiling, for example. Map tiles generally correspond to a two-dimensional organization of geospatial data into a quadtree. Each tile at a given zoom level is divided into four tiles at the next level up to the highest level of magnification. Similarly, three-dimensional organization of geospatial data can be implemented using octrees. To map the surface of the Earth onto a plane, Mercator or another suitable projection can be used.

The map database 18 also stores style parameters 22 for rendering roads at certain zoom levels. For example, style parameters 22A-1, 22-A2, 22A-3, . . . describe style parameters for various styles at zoom level 15, and style parameters 22B-1, 22B-2, 22B-3, . . . describe style parameters for various styles at zoom level 17. Each set of style parameters can describe a respective color and width for each of several strokes. When providing road data to client devices, the map data server 12 can assign a style identifier to each road segment in a given map tile. For example, the map data server 12 can indicate that the segment of an interstate highway present in the map tile should be rendered using style 1, a local road should be rendered using style 4, a bicycle path should be rendered using style 13, etc.

According to some implementations, when the client device 14 requests map data for a certain geographic area to be displayed at zoom level Z, the map data server 12 provides (e.g., to the client device 14 via the network 16) style parameters, and possibly other map data, for the requested zoom level as well for the next zoom level Z+1. Further, the map data server 12 alternatively or additionally can provide some of the map data for the zoom level Z−1. Depending on the implementation, the map data server 12 can provide style parameters (e.g., stroke 1 width=0x05, stroke 1 color=0xFFFF000, stroke 2 width=0x04, stroke 2 color=0x8000FF00) for several styles and at several zoom levels at the same time as the map data or during a separate session for retrieving style parameters.

For example, the client device 14 may request map data for rendering a digital map of a geographic region R at zoom level 15, and the map data server 12 can provide the map data for zoom level 15 along with style information for zoom levels 15 and 17, for each road visible at zoom level 15 (or, alternatively, zoom levels 15 and 17). Using these style parameters, the client device 14 can scale representations of roads in the region R between zoom levels 15 and 17. More particularly, the client device 14 can use the techniques discussed in more detail below to interpolate style parameters and display a certain road segment at zoom level 16, 16.3, 15.55, etc.

With continued reference to FIG. 1, the map data server 12 can be implemented as a single device or as a group of devices. One or more of these devices can include one or more processors 30, a network interface 32, and a non-transitory computer-readable memory 34 that stores instructions executable on the one or more processors 30. For example, a request processor 36 can process requests from a client device, identify and retrieve relevant polylines and style parameters from the map database 18 (along with other relevant map data), and transmit this data to the requesting client device.

Similarly, the map database 18 can be implemented in a single storage device or multiple storage devices. The communication network 16 can include any suitable number of Internet links, local area links, long-range wireless link, short-range wireless links, etc.

In the example of FIG. 1, the client device 14 is a portable device such as a smartphone or tablet computer, for example. In general, however, the techniques for interpolating style parameters and rendering patterns of graphics can be utilized both in portable and non-portable computing devices. In this example, a rendering module 38 of the client device 14 implements an interpolation technique that includes passing indices into an indexed set of uniforms 39 to a vertex shader 74 in the form of augmented vertex attributes.

The client device 14 includes the rendering module 38, a network interface 42 configured to communicate with other devices via the network 16, and a touchscreen 44 configured to receive gesture-based input and to display rendered images generated by the rendering module 38. The rendering module 38 includes one or more general-purpose processors 40, a non-transitory computer-readable memory 46, and a graphics card 48 (e.g., including one or more graphics processing units, or GPUs) that has buffer(s) 66. In other implementations, the client device 14 may include additional components or, conversely, not include some of the components illustrated in FIG. 1.

The memory 46 of the client device 14 stores a mapping application 50 that generates interactive digital maps. Depending on the implementation, the mapping application 50 can operate as a standalone application or as a component of another application such as a web browser, for example. The mapping application 50 includes a style parameter encoder 70. In operation, the style parameter encoder 70 augments vertex attributes (e.g., provided to the vertex shader 74) with style indices (or just "indices") for rendering map features, where each of the indices refer to a corresponding style parameter stored in uniform storage of the graphics card 48 (referred to herein as simply "uniforms" 39). The graphics card 48 may execute the interpolating vertex shader 74 to retrieve style parameters from the uniforms 39 via indices into the uniforms 39. The vertex shader 74 and a fragment shader 76 then render map features according to the retrieved style parameters. When a map feature is to be displayed at an intermediate zoom level (e.g., a zoom level between two discrete zoom levels), the vertex shader 74 and the fragment shader 76 may interpolate style parameters and render roads, or other map features, at specified zoom levels, as discussed in more detail with reference to FIGS. 2A-2C.

The uniforms 39 of the graphics card 48 may include any number of values, attributes, numbers, symbols, etc. utilized by a graphics pipeline to render graphics, such as digital map tiles. The data or parameters in the uniforms 39 is shared among all vertex shaders and fragment shaders of a graphics pipeline, such as the the vertex shader 74 and the fragment shader 76. In an implementation utilizing the OpenGL® Shading Language (GLSL), the uniforms 39 may be declared with a "uniform storage qualifier" and may be passed as parameters to any shader program. The uniforms 39 remain unchanged (i.e., they persist) from the execution of one shader program to the execution of another shader program within a particular rendering process. In some implementations, the uniforms 39 may include constant values, such as positions, styles, etc., across one or more vertices, but, in general, the uniforms 39 may include any parameters constant or non-constant across one or more vertices and passible as parameters to all shaders of a graphics pipeline.

In some cases, programs or modules, such as application programming interfaces (APIs) of the graphics card 48, may constrain the amount of storage for the uniforms 39. The buffers 66 on the graphics card 48 may store the uniforms 39 (e.g., as a read-only register array). However, the rendering module 38 may also store the uniforms 39 in larger off-chip buffers to increase the amount of storage for the uniforms 39.

In some implementations, the uniforms 39 may store an indexed set of style parameters for all map tiles utilized by the mapping application 50. For example, the uniforms 39 may store color, width, or other style parameters for every map tile at every zoom level of a two-dimensional organization of geospatial data (e.g., of the globe). Such, a storage of style parameters in the uniforms 39 allows rendering without a need for frequent updates of the style parameters in the uniforms 39. However, in some other implementations, the uniforms 39 may only store some of the style parameters utilized by the mapping application 50 and may be updated over time to include more or different style parameters.

Providing Indices Corresponding to Style Parameters

Figure 2A:
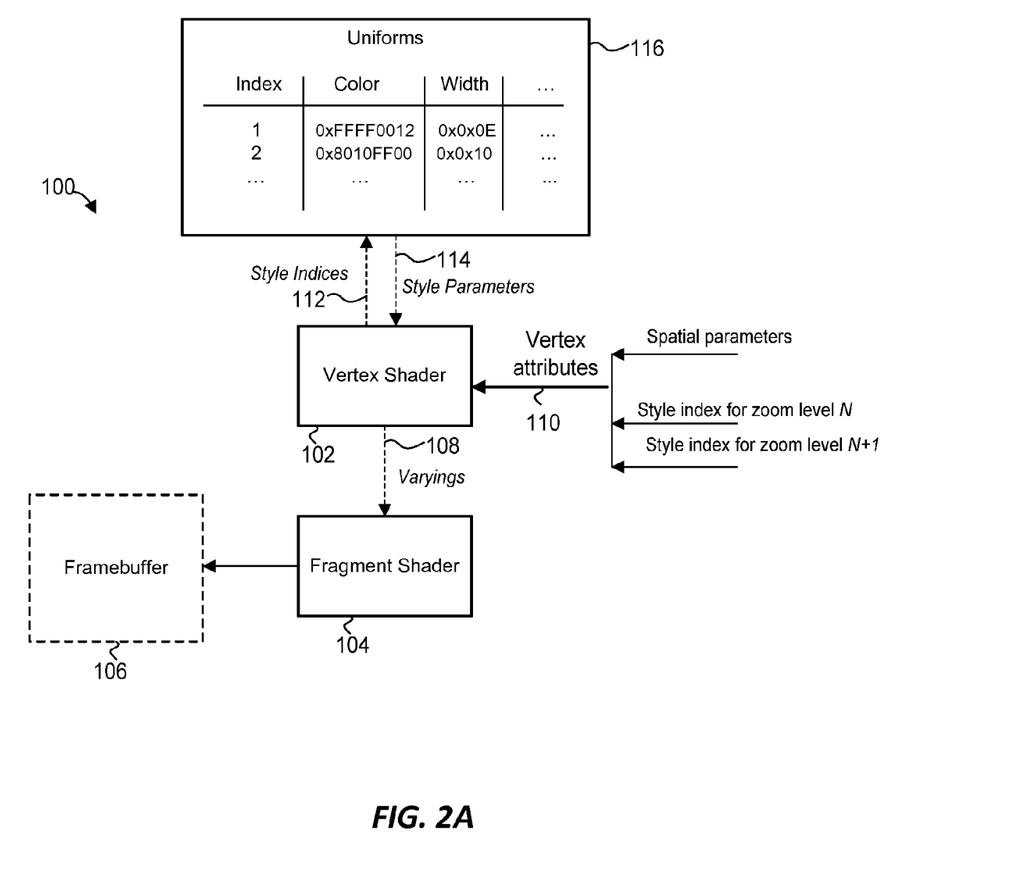
FIG. 2A is a block diagram of an example graphics pipeline that can be implemented in a client device of FIG. 1, in which style information is provided to shaders in the form of indices into a set of uniforms to efficiently and accurately interpolate style parameters for various zoom levels.

Referring to FIG. 2A, a graphics pipeline 100 can be implemented in a rendering module, graphics card, or, more generally, hardware configured to render graphics. The pipeline 100 includes a vertex shader 102 and a fragment shader 104, which can operate on a framebuffer 106. The vertex shader 102 receives vertex attributes 110 that include both conventional spatial parameters, such as coordinates of vertices that make up a road centerline and texture coordinates, and spatial parameters, such as width, color, the number of strokes, etc. During operation, the vertex shader 102 outputs values such as color that are passed to fragment shader 104 in the form of so-called varyings 108. The number of times Y the fragment shader 104 executes can exceed the number of times X the vertex shader 102 executes by a factor of 100, for example.

The graphics pipeline 100 can be implemented in the graphics card 48 in the client device 14, for example. More specifically, the style parameter encoder 70 or other module operating in the mapping application 50 can generate the vertex attributes 110. The shaders 74 and 76 can be implemented as the shaders 102 and 104, respectively.

Figure 2B:
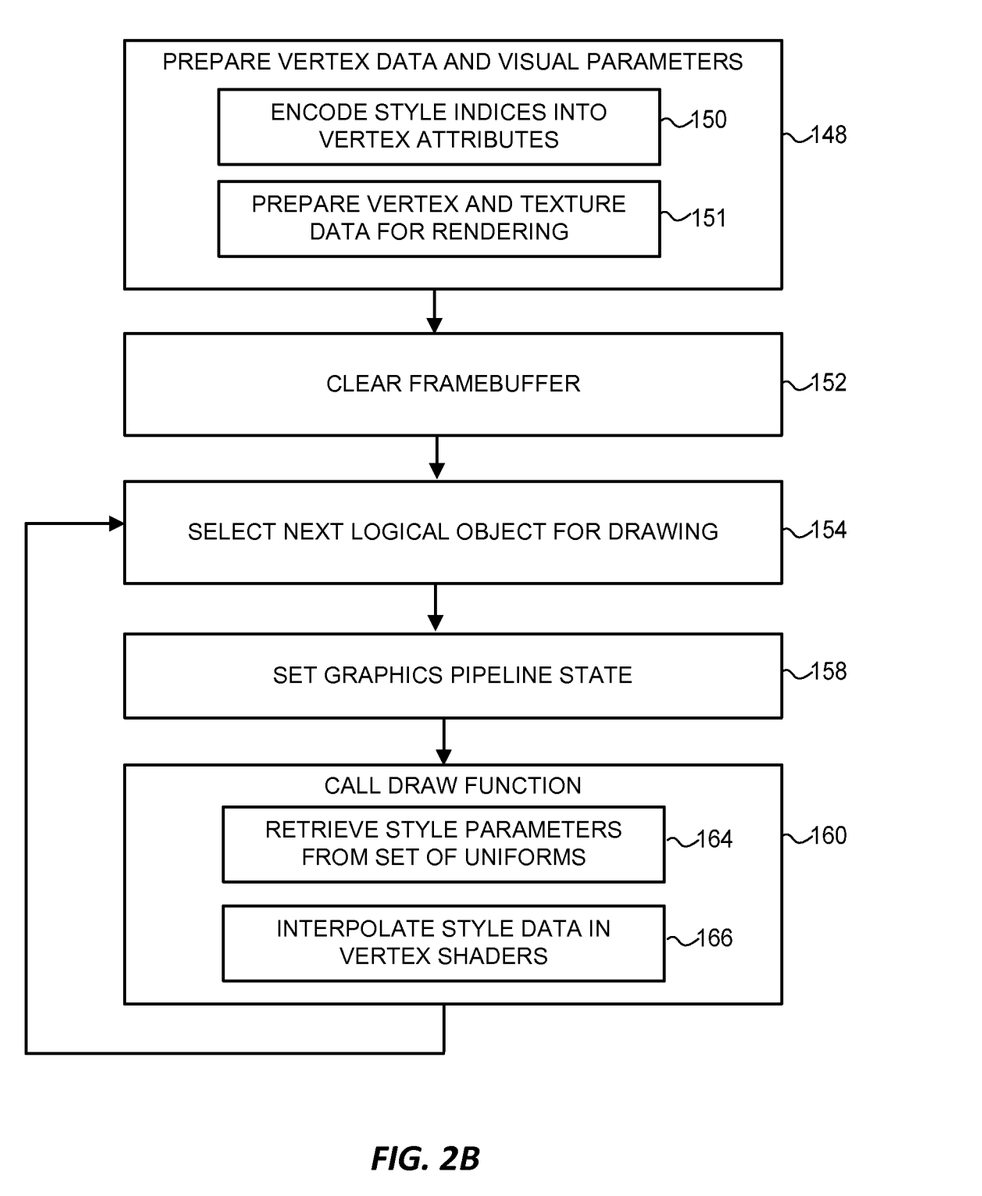
FIG. 2B is a flow diagram of an example method for operating the graphics pipeline of FIG. 2A, which can be implemented in a client device of FIG. 1.

As illustrated in FIG. 2B, before rendering individual frames of information, data including vertex data and associated visual parameters is prepared or initialized (stage 148). Style parameters may be stored in a uniform storage as an indexed set of uniforms 116, for example, as further discussed with reference to FIG. 1. Also, indices (or "style indices") 112 into the indexed set of uniforms 116 are encoded into style vertex attributes at stage 150, which can be executed on a general-purpose processors such as the processors 40 of FIG. 1. As a more specific example, the style parameter encoder 70 can execute block 150 as part preparing the graphics pipeline 100 at stage 148. Vertex and texture data are readied for rendering at stage 151.

To render a frame of information in the graphics pipeline 100, the framebuffer 106 is cleared first at stage 152. At stage 154, a logical object for drawing is selected. For example, all road segments for a certain tile can be put into a Vertex Buffer Object (VBO) so as to be drawn with a one call to a draw function. In some cases, if the amount of data does not fit into a single VBO, the data is split into multiple VBOs. A corresponding style index 112 can be encoded into each vertex to enable the vertex shader 102 to look up style parameters 114 for the vertex in a set of uniforms 116 as this vertex is being drawn. As discussed below, the style parameters 114 can include color and width definitions for various strokes associated with the style.

The graphics pipeline state is set at stage 158, and a draw function is called at stage 160 to execute the vertex shader and the fragment shaders. The graphics pipeline 100 then performs the stages 156, 158, and 160 for the next logical object, until every logical object in the frame has been drawn.

The vertex shader 102 retrieves the style parameters 114 from the uniforms 116, based on the encoded style indices 112 (stage 164), and strokes (or otherwise renders) logical objects (such as roads) according the retrieved style parameters 114. In some cases, the vertex shader 102 interpolates the style parameters 114 for a certain zoom level (stage 166), as discussed in more detail with reference to FIG. 2C.

Figure 2C:
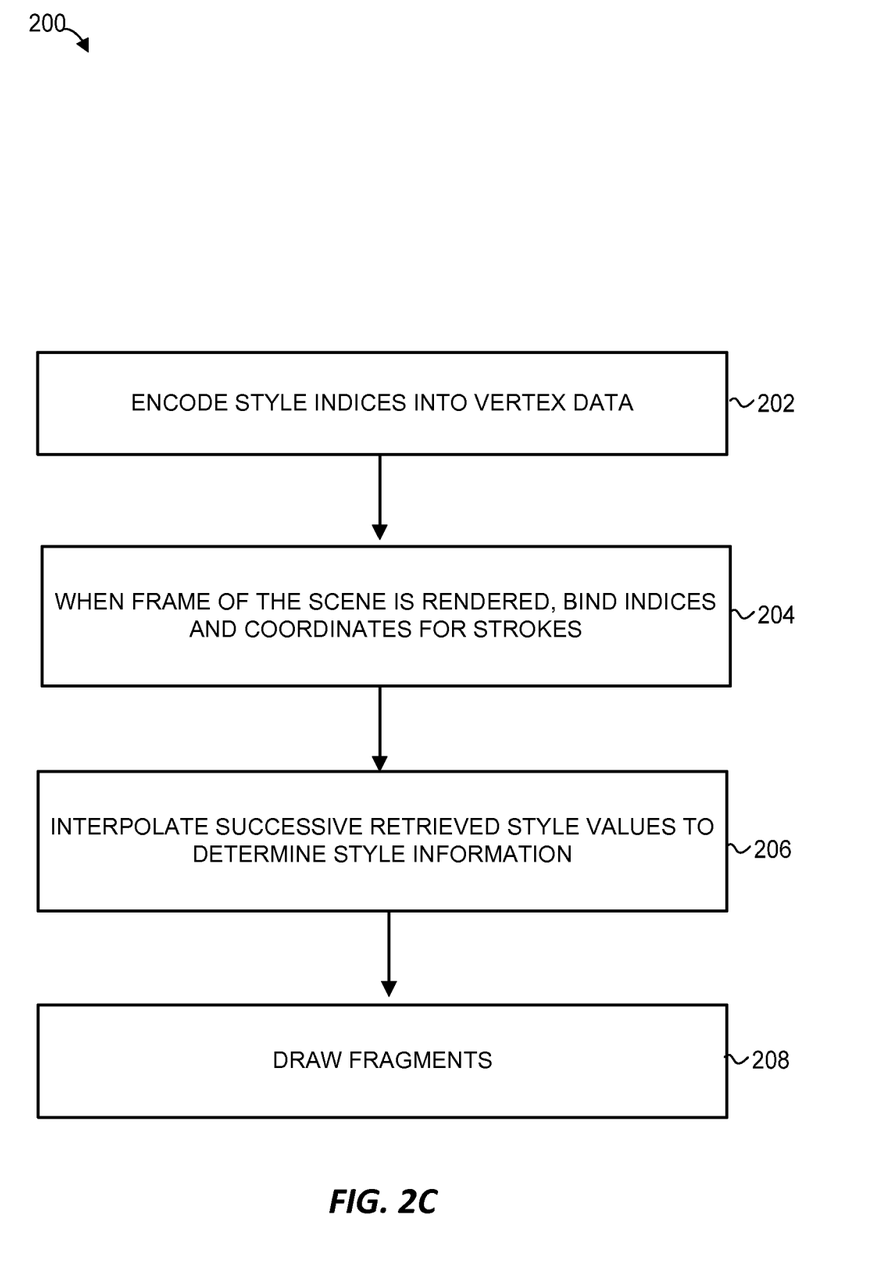
FIG. 2C is a flow diagram of an example method for generating parameters for the graphics pipeline of FIG. 2A and interpolating style information in the graphics pipeline, which can be implemented in a client device of FIG. 1.

Now referring to FIG. 2C, at least some of the blocks of an example method 200 for generating parameters for the graphics pipeline of FIG. 2A can be implemented in the style parameter encoder 70, for example, as a set of software instructions that execute on the processor(s) 40. Likewise, at least some of the blocks of an example method 200 for generating parameters for the graphics pipeline of FIG. 2A can be implemented in the graphics card 48, for example. Generally, any combination of components of the rendering module 38 may implement blocks of the example method 200.

The method 200 begins at block 202 where indices corresponding to style parameters are encoded into vertex attributes. These indices augment fixed vertex attributes that contain spatial position information related to an object, such as Cartesian coordinates of the object. The indices may refer to, or point to, style parameters in a set of uniforms. The style parameters referred to by the indices may indicate widths and colors for several strokes, number of strokes, etc. (as illustrated in the uniforms 116 of FIG. 2A). Referring back to FIG. 1, one index may reference style parameters 22A-1 for road style S1 at zoom level 15, another index may reference style parameters 22A-2 for road style S2 at zoom level 15, and another index may reference style parameters 22B-2 for road style S2 at zoom level 17.

In some implementations, indices may be grouped into containers, such as vertex buffer objects (VBOs), that are separate, but which can be combined interchangeably with conventional vertex attributes describing position. Further, the grouping of indices can be further delineated based on zoom levels. For example, indices partitioned into a VBO may be aggregated into a vertex array object (VAO) for each zoom level. Again referring back to FIG. 1, an index referring to style parameters 22A-1 (e.g., stored in the uniforms 39) and an index corresponding to style parameters 22B-1 (both of which describe road style S1 at different zoom levels) can form a zoom style group G, which a vertex shader may use to interpolate style parameters at least in the range between zoom level 15 and zoom level 17.

At block 204, indices representing styles along with the corresponding conventional vertex attributes may be "bound" (e.g., by executing appropriate function(s) supported by the graphics pipeline and the programming language) to the vertex shader when a frame of a scene is rendered, for the current zoom level of the virtual camera. Thus, indices pointing to uniform style parameters can be understood as logical, variable groups of vertex attribute data that can be interchangeably combined with canonical fixed vertex attribute data, in accordance with the current zoom level.

For example, the mapping application 50 of FIG. 1 can process user input, such as an instance of a pinch-to-zoom gesture applied to the touchscreen 44, and determine that the current zoom level for the camera should be 15.7. The mapping application 50 can obtain a polyline for a road segment visible in the viewport at zoom level 15.7, identify style S1 in which the road segment must be rendered, and indicate to the style parameter encoder 70 that the zoom level should be 15.7. The style parameter encoder 70 in turn can select, from among the available set of resources, style parameters 22A-1 and 22B-1 for style S1 corresponding to zoom levels 15 and 17, respectively. The style parameter encoder 70 then may execute blocks 202 and 204 to prepare vertex attributes (including indices to the style parameters 22A-1 and 22B-1) for use by a vertex shader.

It is noted that, if style parameters are available (e.g., stored in the uniforms 39) for zoom levels more proximate to the selected zoom level, the mapping module 46A can use these parameters instead. Thus, if style parameters for zoom levels 15 and 16 are available, the mapping application 50 may encode indices to these style parameters (rather than indices to style parameters for zoom levels 15 and 17) for rendering a road at zoom level 15.7. Further, if a current zoom level corresponds to a discrete zoom level, the mapping application 50 may only encode an index corresponding to style parameters of that discrete zoom level.

When the frame of the scene is rendered, successive style parameters, which correspond to successive zoom levels, are retrieved from uniforms based on corresponding indices. The style parameters are, in some cases, interpolated in a vertex shader, in accordance with the current zoom level of the virtual camera (block 206). The fragments of the map feature are then drawn at block 208.

The position of a camera in a mapping application (e.g., defining the visible area of a digital map) may change near continuously (e.g. when paired with a pinch gesture). However, in some implementations, rendering state updates required for drawing may only occur at the frequency of discrete zoom-level changes. That is, a rendering module may draw frames at an intermediate zoom level without the need to continuously update a GPU state containing style information.

Referring generally to FIGS. 2A-C, it is noted that these techniques do not require a storage of style parameters for each vertex. Rather, indices into a common set of indexed style parameters, stored as uniforms, prevent unnecessary replication of style parameters that are likely the same for many vertices.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

Some of the methods or routines discussed above may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Some portions of this specification are presented in terms of algorithms or flow diagrams representing operations on data stored as bits or binary digital signals within a machine memory (e.g., a computer memory). These algorithms or flow diagrams are examples of techniques used by those of ordinary skill in the data processing arts to convey the substance of their work to others skilled in the art. In this context, methods represented by flow diagrams involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion.

For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for rendering digital maps through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for providing map features on interactive digital maps, the method comprising:
   by one or more general-purpose processors, storing style parameters in a memory of a graphics card equipped with one or more graphics processors as an indexed data structure in one or more uniform variables, wherein the style parameters specify respective visual parameters for rendering a plurality of map features at a plurality of zoom levels, wherein the one or more uniform variables are (i) accessible in multiple stages of a rendering pipeline, (ii) unchanged during execution of the multiple stages of the rendering pipeline, and wherein the one or more general-purpose processors and the one or more graphics processors are different types of processors;
   encoding, by the one or more general-purpose processors, each of the style parameters stored in the indexed data structure within the graphics card as an index to generate a plurality of indices, wherein each index is used by the one or more graphics processors for retrieving a corresponding style parameter;
   receiving, by the one or more general-purpose processors, via a user interface, a selection of a zoom level at which the map features are to be displayed;
   providing, by the one or more general-purpose processors, one or more of the plurality of indices encoded as vertex attributes into the indexed data structure to a vertex shader executable on the one or more graphics processors, wherein the one or more indices correspond to style parameters for rendering the map features at the selected zoom level; and
   causing the vertex shader to retrieve the corresponding style parameters from the indexed data structure in the one or more uniform variables within the graphics card using the one or more indices and render the map features at the selected zoom level using the retrieved style parameters.

2. The method of claim 1, wherein encoding the one or more indices as vertex attributes includes generating, by the one or more general-purpose processors, zoom level-specific logical containers combinable with vertex attributes that specify vertex coordinates.

3. The method of claim 1, wherein the style parameters specify respective visual parameters for a plurality of zoom levels not including the selected zoom level, wherein the selected zoom level is between a first one of the plurality of zoom levels and a second one of the plurality of zoom levels, and wherein providing the one or more indices into the indexed data structure includes: providing a first index into the indexed data structure for accessing style parameters corresponding to the first one of the plurality of zoom levels, and providing a second index into the indexed data structure for accessing style parameters corresponding to the second one of the plurality of zoom levels.

4. The method of claim 3, further comprising: configuring the vertex shader to interpolate between the style parameters corresponding to the first one of the plurality of zoom levels and the style parameters corresponding to the second one of the plurality of zoom levels to generate interpolated style parameters for the selected zoom level.

5. The method of claim 1, wherein the selected zoom level is one of the plurality of zoom levels, the method including providing, by the one or more general-purpose processors, exactly one index into the indexed data structure to the vertex shader.

6. The method of claim 1, further comprising: receiving, by the one or more general-purpose processors, the style parameters from a network server via a communication network.

7. The method of claim 1, wherein: each map feature is a stylized representation of a path corresponding to one of a road, a bicycle path, or a mass transit line, and the set of style parameters specifies at least a stroke, a width, and a color.

8. The method of claim 1, wherein storing the plurality of style parameters as the indexed plurality of uniform parameters includes storing a complete set of style parameters utilized by a mapping application as the indexed plurality of uniform parameters.

9. The method of claim 1, wherein the one or more indices provided to the vertex shader are included in a vertex buffer object (VBO) which is combinable with vertex attributes that specify vertex coordinates for rendering the map features.

10. A non-transitory computer-readable medium storing thereon instructions that, when executed on one or more general-purpose processors of a computing device, cause the one or more general-purpose processors to:
   (i) store style parameters in a memory of a graphics card equipped with one or more graphics processors as an indexed data structure in one or more uniform variables, wherein the style parameters specify respective visual parameters for rendering a plurality of map features at a plurality of zoom levels, wherein the one or more uniform variables are (i) accessible in multiple stages of a rendering pipeline implemented in the one or more graphics processors, (ii) unchanged during execution of the multiple stages of the rendering pipeline, wherein the array is indexed by style identifiers, and wherein the one or more general-purpose processors and the one or more graphics processors are different types of processors;
   (ii) encode each of the style parameters stored in the indexed data structure within the graphics card as a style identifier to generate a plurality of style identifiers, wherein each style identifier is used by the one or more graphics processors for retrieving a corresponding style parameter;

(iii) receive, via a user interface of the computing device, a selection of a zoom level at which the map features are to be displayed;

(iv) determine a style identifier of the plurality of style identifiers that identifies a style with which each map feature is rendered at the selected zoom level;

(v) provide the style identifier encoded as a vertex attribute to a vertex shader executable on the one or more graphics processors; and (vi) cause the vertex shader to retrieve the corresponding style parameters from the array of uniform variables within the graphics card using the style identifier and render the map features at the selected zoom level using the retrieved style parameters.

11. The computer-readable medium of claim 10, wherein the selected zoom level is between two consecutive zoom levels of the plurality of zoom levels, and wherein each map feature is rendered at the selected zoom level without continuously updating a state of a graphics processing unit associated with the vertex shader.

12. The computer-readable medium of claim 10, wherein the style identifier is a first style identifier that identifies a first style, wherein the instructions further cause the one or more general-purpose processors to: determine a second style identifier that identifies a second style, provide the second style identifier to the vertex shader along with the first style identifier, and cause the vertex shader to retrieve style parameters for the first style and the second style to render each map feature.

13. A computing device comprising:
one or more general-purpose processors;
a graphics pipeline implemented in one or more graphics processors;
a uniform buffer in a memory of a graphics card equipped with the one or more graphics processors, wherein the uniform buffer stores uniform parameters accessible in multiple stages of a rendering pipeline, wherein the uniform parameters are unchanged during execution of the multiple stages of the rendering pipeline, and wherein the one or more general-purpose processors and the one or more graphics processors are different types of processors;
a user interface; and
a non-transitory computer-readable memory storing thereon instructions that, when executed by the one or more general-purpose processors, cause the computing device to:
store, as an indexed data structure in the uniform buffer, style parameters specifying respective visual parameters for rendering a plurality of map features at a plurality of zoom levels,
encode each of the style parameters stored in the indexed data structure within the graphics card as an index to generate a plurality of indices, wherein each index is used by the one or more graphics processors for retrieving a corresponding style parameter;
receive, via a user interface, a selection of a zoom level at which the map features are to be displayed,
provide one or more of the plurality of indices encoded as vertex attributes into the indexed data structure to a vertex shader executable on the one or more graphics processors, wherein the one or more indices correspond to style parameters for rendering the map features at the selected zoom level, and
cause the vertex shader to retrieve the corresponding style parameters from the indexed data structure in the uniform buffer within the graphics card using the one or more indices and render the map features at the selected zoom level using the retrieved style parameters.

14. The computing device of claim 13, wherein the complete set of style parameters includes style parameters for a plurality of map tiles utilized by a mapping application.

15. The computing device of claim 13, wherein to encode the one or more indices as vertex attributes, the instructions cause the computing device to generate zoom level-specific logical containers combinable with vertex attributes that specify vertex coordinates.

16. The computing device of claim 13, wherein the style parameters specify respective the respective visual parameters for a plurality of zoom levels not including the selected zoom level, wherein the selected zoom level is between a first one of the plurality of zoom levels and a second one of the plurality of zoom levels, and wherein to provide the one or more indices into the indexed data structure, the instructions cause the computing device to: provide a first index into the indexed data structure for accessing style parameters corresponding to the first one of the plurality of zoom levels, and provide a second index into the indexed data structure for accessing style parameters corresponding to the second one of the plurality of zoom levels.

17. The computing device of claim 16, wherein the instructions cause the computing device to: configure the vertex shader to interpolate between the style parameters corresponding to the first one of the plurality of zoom levels and the style parameters corresponding to the second one of the plurality of zoom levels to generate interpolated style parameters for the selected zoom level.

18. The computing device of claim 13, wherein the selected zoom level is one of the plurality of zoom levels, wherein the instructions cause the computing device to provide exactly one index into the indexed data structure to the vertex shader.

* * * * *